United States Patent [19]
Stephens

[11] Patent Number: 5,141,363
[45] Date of Patent: Aug. 25, 1992

[54] MOBILE TRAIN FOR BACKFILLING TUNNEL LINERS WITH CEMENT GROUT

[76] Inventor: Patrick J. Stephens, 1276 Chuckanut Dr., Bellingham, Wash. 98225

[21] Appl. No.: 679,524

[22] Filed: Apr. 2, 1991

[51] Int. Cl.$^5$ .................................. E21D 11/10
[52] U.S. Cl.$^5$ ..................... 405/150.1; 405/146; 405/150.2
[58] Field of Search ........... 405/132, 133, 146, 150.1, 405/150.2, 154, 155

[56] References Cited

U.S. PATENT DOCUMENTS

| | | | |
|---|---|---|---|
| 1,778,099 | 10/1930 | Webb | 405/150.2 X |
| 2,429,045 | 10/1947 | Bellows. | |
| 2,995,901 | 8/1961 | Kemper. | |
| 4,280,771 | 7/1981 | Schwing et al. | 405/150.1 |
| 4,365,781 | 12/1982 | Johannson. | |
| 4,516,879 | 5/1985 | Berry et al. | |
| 4,652,174 | 3/1987 | Cornely et al. | |
| 4,710,058 | 12/1987 | Han. | |
| 4,793,736 | 12/1988 | Thompson et al. | |
| 4,822,211 | 4/1989 | Shinoda et al. | |
| 4,892,441 | 1/1990 | Riker. | |
| 4,915,541 | 4/1990 | Thompson et al. | |
| 4,940,360 | 7/1990 | Weholt. | |

*Primary Examiner*—David H. Corbin
*Attorney, Agent, or Firm*—Hughes & Multer

[57] ABSTRACT

A mobile train for mixing foamed cement grout within a tunnel and injecting the grout into the annular cavity between the tunnel bore and liner. Cement slurry is supplied to the train through a conduit from a remote mixing plant, and finished foam is formed by a foam generator on the train and mixed with the cement slurry to form the fooamed cement grout. The train is movable longitudinally through the tunnel so that the liner can be grouted in segments while at the same time avoiding the need to pump the foamed cement grout over excessively long distance. The train is made up of several wheeled cars which are pulled through the tunnel by a tractor.

31 Claims, 6 Drawing Sheets

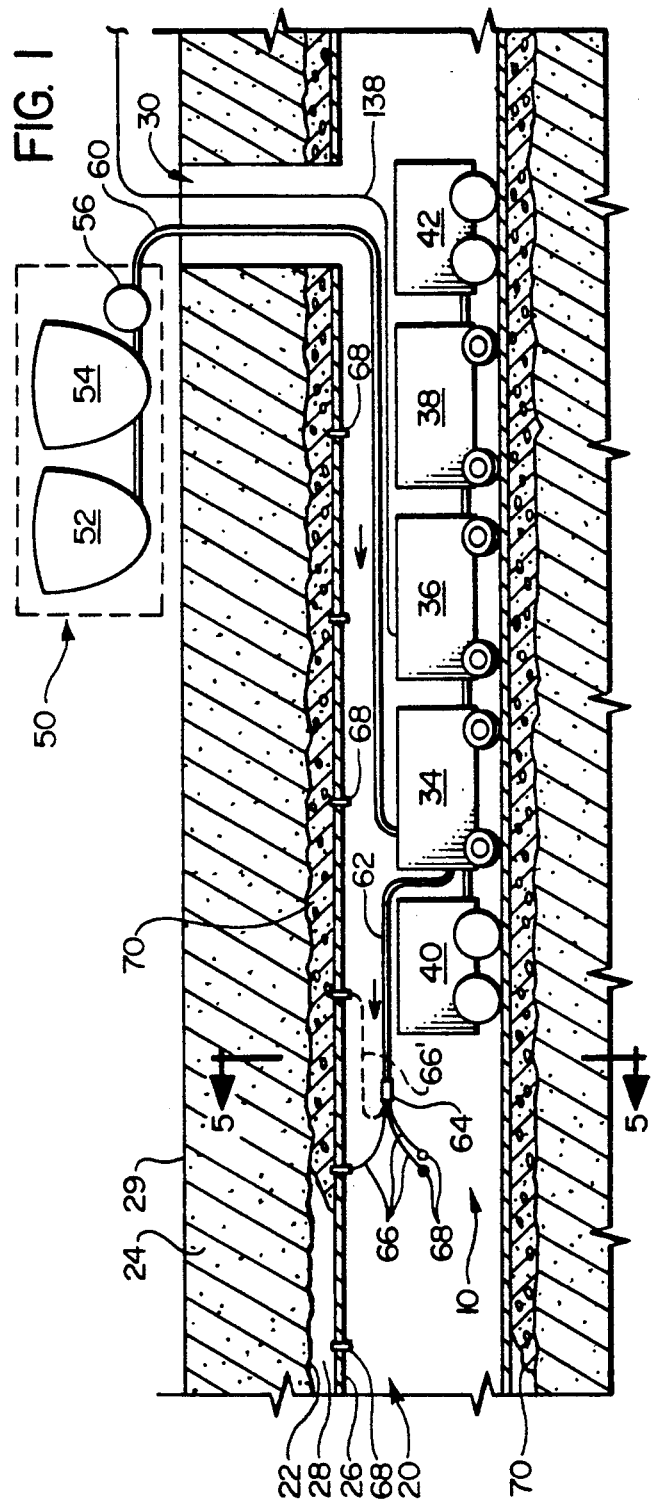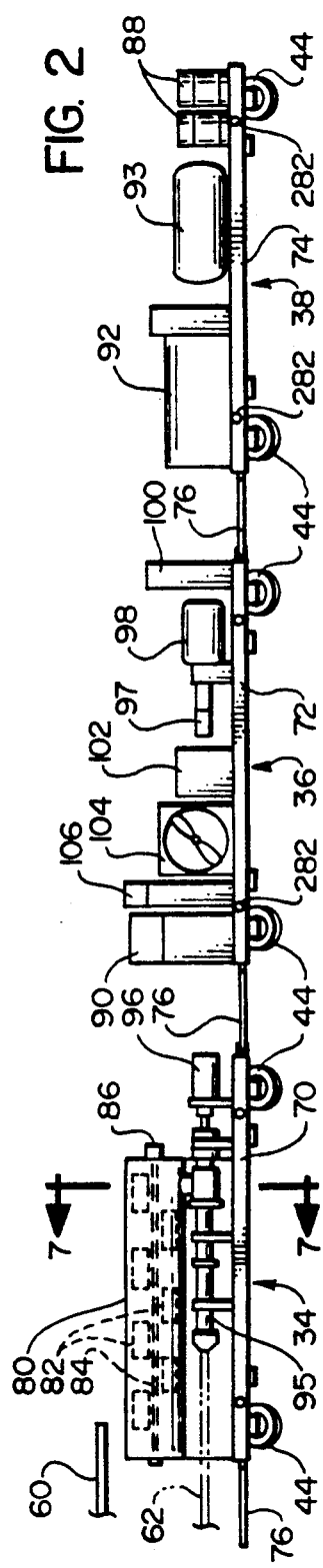

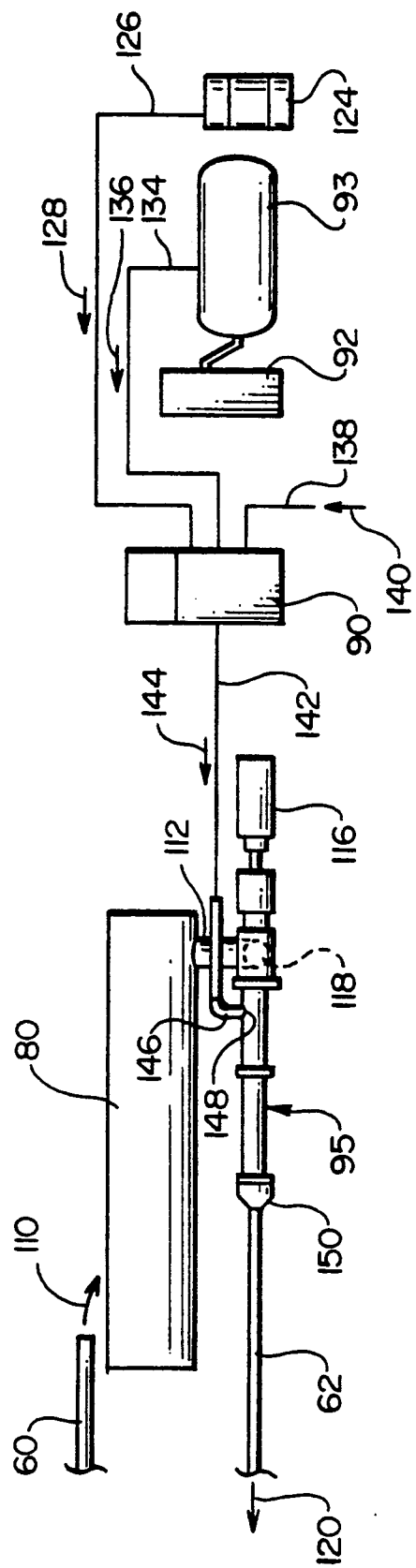

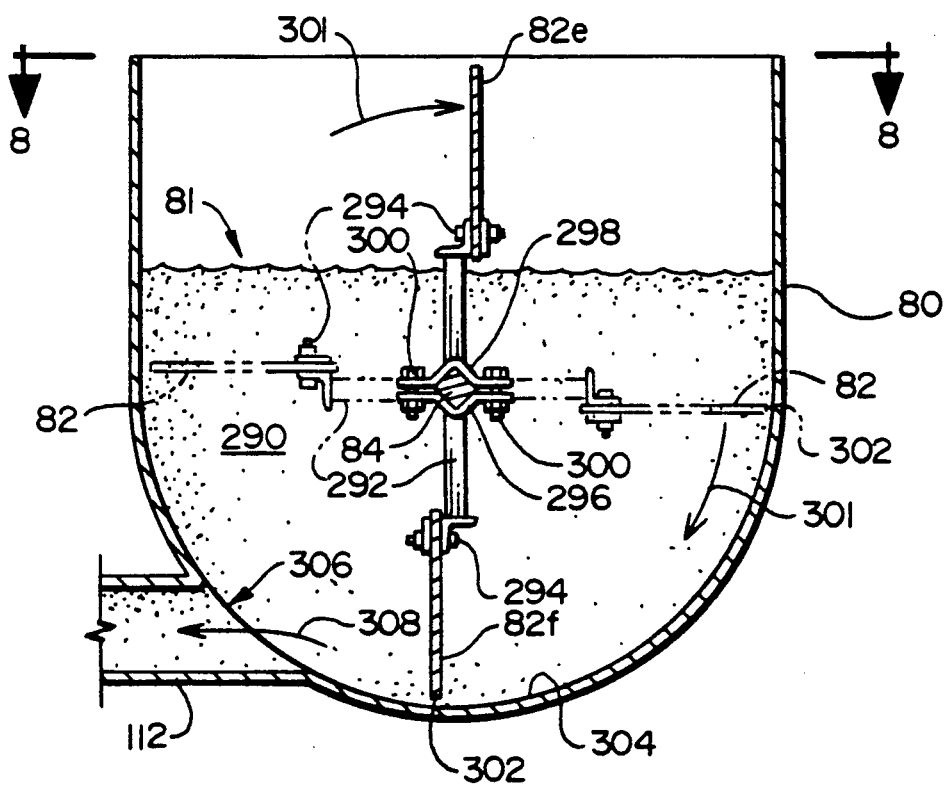

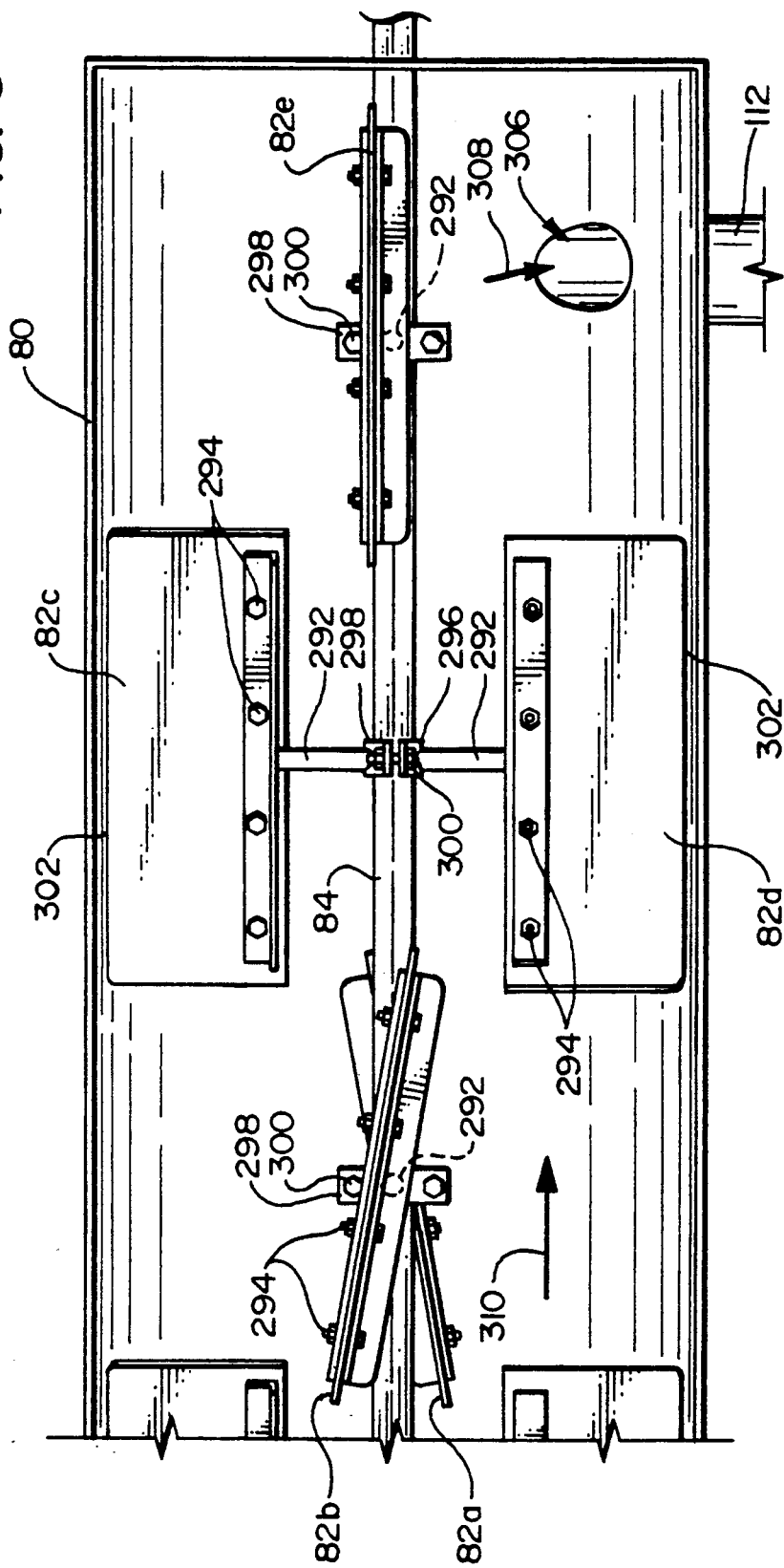

MOBILE TRAIN FOR BACKFILLING TUNNEL LINERS WITH CEMENT GROUT

BACKGROUND OF THE INVENTION

1. Field of the Invention

The present invention relates generally to apparatus and methods for backfilling tunnel liners. More particularly, the present invention relates to a mobile train configured to move longitudinally through a tunnel liner and locally mix and inject foamed cement grout into the annular cavity between the tunnel bore and the liner.

2. Background Art

As tunnelling technology and equipment have improved during the past several decades, the rate at which tunnels can be excavated has significantly increased, as has the distances over which they can be constructed. As a consequence, the distances between tunnel openings or access shafts are frequently very great in modern-day tunnels. For example, it is not uncommon for the distances between access shafts to be on the order of several miles, and between these the tunnel is frequently overlain by a terrain or structure (e.g., an airport) which prohibits drilling from the surface to the tunnel between such access shafts.

In most cases, a tunnel is not complete until a liner has placed along the perimeter of the bored hole. Not only is this usually necessary to prevent the walls of the tunnel bore from eroding or collapsing, but it is also often necessary to protect whatever it is that the tunnel is conducting—water, electrical transmission lines, atomic particle acceleration paths, and so forth—from coming into contact with the surrounding subterranean formation. Such a lining may be installed by a number of ways, but in a typical technique, a tubular tunnel liner is placed within a cylindrical outer bore which forms the tunnel wall; in many cases (particularly in newly constructed tunnels), this outer bore is the excavation formed through the subterranean formation itself, while in other cases (for example, when renovating existing tunnels such as eroded sewer lines), the tubular tunnel liner is pulled or jacked into place inside of a pre-existing outer pipe. In either case, the tunnel liner is necessarily smaller in diameter than the outer bore, so that the necessary clearance is provided between the two to permit installation of the liner, with the result that an annular cavity is formed intermediate the liner and the outer bore. In most cases, this annular cavity must then be filled with material to stabilize the liner within the bore and to prevent material from collapsing from the outer bore and damaging the liner. One generally preferred backfilling technique is to fill this annular cavity with cement grout.

When lining tunnels in the manner described, it has been found economically advantageous to employ relatively thin, lightweight tubular lining material. For example, in renovation of existing cement sewer lines, thin, high density polyethylene pipe liners are often used. While these liners are inexpensive, they are also typically unable to withstand significant external pressures and weight, and this problem can be minimized by using a lightweight foamed cement grout to backfill) such liners. Such foamed cement grouts also possess significant economic advantages in and of themselves: because foamed cement grouts are fluid and non-shrinking, the need for contact grouting is eliminated; also, in a foamed cement grout, a finished foam, comprising a mass or aggregate of bubbles, is mixed in with a cement slurry so that a great many entrained air spaces are created within the grout. Because a relatively large volume of air is thus entrained in the grout, the amount of cement slurry which is needed to backfill or grout a particular size of cavity is significantly reduced. Especially when grouting large tunnel liners which extend over great distances, the cost savings resulting from the reduction in the amount of cement slurry required when using foamed cement grout can be very great.

Although foamed cement grout is thus a highly advantageous material for use in backfilling tunnel liners, this material, once mixed, is often relatively viscous, and frequently compresses and causes friction and back-pressure when pumped through conduits. Thus, while the cement slurry is relatively fluid and easy to pump over significant distances, once it is mixed with the finished foam to produce the foamed cement grout, it is no longer feasible to pump the grout over very long distances, whether through a conduit or through the annular cavity between the tunnel bore and liner. This difficulty is seriously aggravated by the fact that, as discussed above, modern day tunnels and shafts often extend for great distances between access points.

Attempts have been made to mix batches of foamed cement grout within a tunnel when grouting the tunnel liner. These attempts have taken the form of transporting dry cement (e.g., in bags) to a very small batch mixer in the tunnel, and then manually dumping the dry cement into the mixer and mixing this with water and foam to form the foamed cement grout. The foamed cement grout can thus be mixed only in small batches, and so this approach is necessarily exceedingly slow and expensive. Furthermore, because the operation is not continuous, it has been found exceedingly difficult to provide adequate quality control of the foamed cement grout which is so produced.

Another approach which has been proposed is to drill small diameter vertical shafts from the surface to the tunnel bore at various points between the access shafts, so as to be able to inject foamed cement grout from the surface into the annular cavity between the tunnel liner and bore at these points. The drilling of such bores is, of course, extremely expensive, and furthermore, as noted above, the tunnel is frequently overlain by terrain which renders the drilling of such bores infeasible.

Thus, there exists a need for an apparatus and method for using foamed cement grout to backfill tunnel liners which avoids the need to pump the foamed cement grout over long distances into the tunnel bore. Furthermore, there is a need for such an apparatus and method for continuously forming and injecting such foamed cement grout, so that high volumes of grout can be placed over long distances quickly, and with a high degree of quality control. The present invention solves the problems cited above, and improved apparatus and methods are hereinafter described for backfilling or grouting a tunnel liner with foamed cement grout.

SUMMARY OF THE INVENTION

The present invention comprises generally a machine for grouting an annular cavity formed intermediate an elongate external bore and a tubular internal member disposed in the bore. The machine comprises a vehicle configured for longitudinal movement in the tubular internal member, means for supplying cement slurry to the vehicle from a remote site, foam generating means mounted on the vehicle for forming finished foam, mixing means mounted on the vehicle for mixing the finished foam with the cement slurry to form foamed cement grout, and means for injecting the foamed cement grout from the vehicle into the cavity intermediate the tubular internal member and the external bore.

In a preferred embodiment, the elongate external bore is a tunnel bore and the tubular internal member is a tunnel liner, and the remote site from which the cement slurry is supplied to the vehicle is located at a position outside of the tunnel bore. The means for supplying the cement slurry to the vehicle may comprise a cement mixing plant located on the surface of the ground outside of the tunnel bore for mixing the cement slurry, a conduit connecting the cement mixing plant to the vehicle, and a pump for pumping the cement slurry from the mixing plant to the vehicle through the conduit.

The vehicle of the grouting machine may comprise a train of wheeled cars which extend longitudinally within the tunnel liner. These wheeled cars are preferably attached to at least one tractor for moving the train longitudinally through the tunnel.

The means for injecting the foamed cement grout into the cavity between the inner and outer members may comprise a primary conduit having a first end connected to the train for receiving the grout pumped from the train, a manifold connected to the second end of the primary conduit, and a plurality of flexible hoses mounted to the manifold so that the foamed cement grout is distributed to the hoses from the manifold. An injection fitting is mounted to the second end of each of the hoses for injecting the grout into the cavity between the liner and bore. Preferably, each injection fitting is configured to permit selective control of the flow of grout through the hose to which it is attached.

Preferably, each car in the train has first and second wheels positioned on laterally opposite sides of the car, each wheel extending from the car at an angle such that the wheel engages the cylindrical inner wall of the tunnel liner at a perpendicular angle thereto, and the car is supported horizontally between the wheels in engagement with the wall. In a preferred embodiment, the angle at which the wheels extend from each car is selectively adjustable from a first angle at which the wheels perpendicularly engage an inner wall of the first tunnel liner having a first internal diameter, to a second angle at which the wheels perpendicularly engage an inner wall of a second tunnel liner having a second internal diameter. This adjustability may be provided by having first and second sleeves mounted to the car, the first sleeve having an axis such that the wheel extends from the car at the first angle when the axle is inserted therein, and the second sleeve having an axis such that the wheel extends at the second angle when the axle is inserted in the second sleeve. Preferably, each wheel is provided with a rubber tire for engaging the inner wall of the liner.

In preferred embodiments, a container may be mounted on the vehicle for carrying a supply of liquid foam concentrate for a foam generator which is also mounted on the vehicle. The foam generator mixes the liquid foam concentrate with water and air to form finished foam.

Also mounted on the vehicle may be a pump for pumping the foamed cement grout through the discharge conduit from the vehicle and into the cavity between the tunnel liner and bore.

A generator may also be mounted on one of the cars for generating power to operate the foam generator, the means for mixing the cement slurry and finished foam, and the grout pump. This generator may be a hydraulic pump, with each of the foam generator, mixing means, and grout pump being operated by a hydraulic motor. In another embodiment, the generator may be an electrical generator, with each of these components being operated by an electric motor.

Preferably, the tractor for pulling the train is mounted at the forward end thereof, and the container for carrying the supply of liquid foam concentrate is mounted at the rearward end of train so as to permit the container to be periodically resupplied with liquid foam concentrate brought from the surface.

As a further refinement, the grouting machine may include a cement hopper mounted on the vehicle above the grout pump, for holding a supply of the cement slurry which is conveyed to the vehicle through the supply conduit from the remote cement mixing plant. A chute or line extends from a lower portion of the cement hopper to an intake or suction portion of the pump, and this line may preferably extend in a vertical direction to the pump below the hopper so that the supply of cement in the hopper is fed into the intake portion of the pump under substantially constant head of pressure. A remixer is preferably provided for agitating the cement slurry in the hopper so as to prevent it from separating or setting up before it is fed into the pump. The remixer may be a plurality of paddles mounted in the hopper so as to be partially submerged in the cement slurry, with means being provided for rotating the paddles in the trough to stir the cement slurry so as to prevent it from separating or setting up.

Water may be supplied to the foam generator through a water supply conduit which connects the train to a source of water located outside of the tunnel. The air may be supplied to the foam generator by an air compressor which is mounted on the vehicle. The air compressor may be connected to a compressed air reservoir which is also mounted on the vehicle, for storing the compressed air generated by the compressor, with connecting means being provided for selectively supplying the compressed air from the reservoir to the foam generator.

A method is also provided for grouting an annular cavity intermediate a tunnel bore and tunnel liner, this comprising positioning a vehicle for longitudinal movement in the tunnel liner, and supplying cement slurry to the vehicle through a conduit from the cement mixing plant at a remote position outside of the tunnel. Liquid foam concentrate is mixed on the vehicle with air and water to form finished foam, and the finished foam is mixed on the vehicle with the cement slurry to form foamed cement grout. The foamed cement grout is pumped from the vehicle into the cavity between the tunnel liner and bore at an injection point.

The method may further comprise the steps of forming a plurality of such injection points at longitudinally spaced apart locations in the tunnel liner, and transporting the vehicle longitudinally in the tunnel liner to a position generally proximate a selected injection point so as to permit the foamed cement grout to be pumped a relatively short distance from the vehicle to the selected injection point.

These and other novel features and advantages of the present invention will become apparent from the following detailed description, wherein reference is made to the FIGURES in the accompanying drawing.

BRIEF DESCRIPTION OF THE DRAWINGS

FIG. 1 is an elongated cross-sectional view of a tunnel having a grouting machine in accordance with the present invention positioned for longitudinal movement therein, this being supplied with cement slurry from a mixing plant located outside of the tunnel;

FIG. 2 is a side elevational view of three wheeled cars of the grouting machine of FIG. 1, showing individual components mounted thereon;

FIG. 3 is a schematic view showing the systems of the grouting machine of FIG. 1 for generating finished foam and for mixing the foam with the cement slurry supplied from the surface;

FIG. 7 is an end view of a cross-section taken along line 7—7 shown in FIG. 2, through the cement slurry hopper of the grouting machine of FIG. 1, showing the paddles positioned therein for remixing the slurry so as to prevent it from separating or setting up prior to being fed into the injection pump of the machine; and FIG. 8 is an overhead view of a portion of the mixing hopper, taken along line 8—8 shown in FIG. 7, showing the angulation of the mixing paddles relative to the longitudinal axes of the hopper and the drive shaft so that rotation of the remixer drives the slurry through the hopper towards the discharge chute.

DETAILED DESCRIPTION

Figure 4:
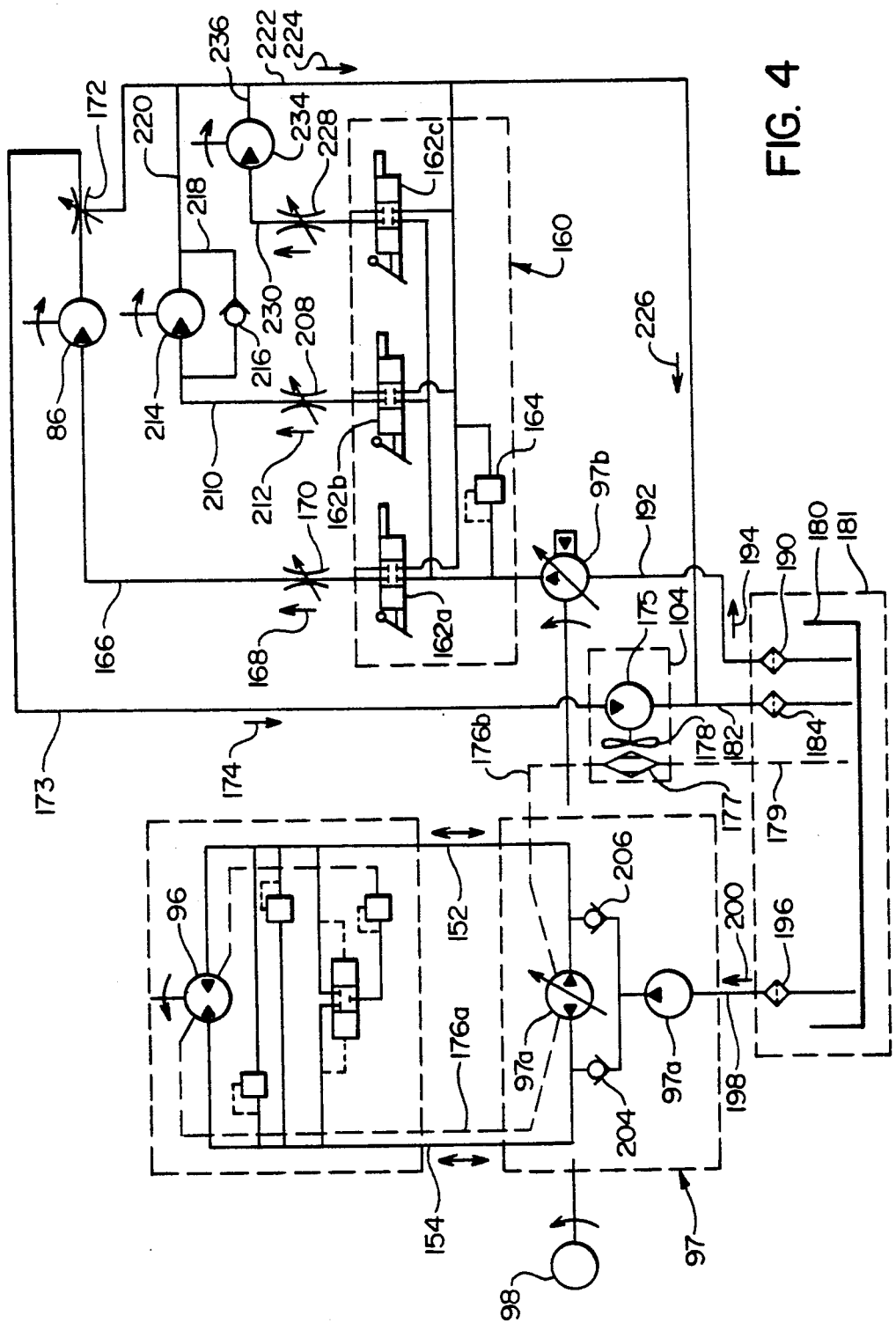
FIG. 4 is a schematic view of the hydraulic system of the grouting machine of FIG. 1, this being employed to power various components of the machine.

FIG. 1 shows a grouting machine 10 in accordance with the present invention, this being positioned for longitudinal movement in a subterranean tunnel 20. Subterranean tunnel 20 comprises generally a cylindrical bore 22 formed in the earth or formation 24, and a cylindrical liner 26 which has been installed in bore 22. The inner wall of cylindrical liner 26 has a known diameter, this diameter typically ranging from perhaps 60 inches up to many feet, for large sewers, aqueducts, and the like. Although most commonly the tunnel bore and liner are cylindrical in shape, these elements may have any of a wide variety of transverse cross-sections other than circular; for example, in some cases, either or both the tunnel bore and liner might have an oval, polygonal, or other cross section.

As previously noted, the tunnel liner 26 must necessarily be smaller than the tunnel bore 22 so as to permit the liner to be installed in the bore, and an annular gap 28 is consequently formed between the outer wall of liner 26 and the bore 22. Particularly in large installations, the liner 26 may be centered in bore 22 by wooden cribbing or other suitable means, so that the annular gap 28 extends substantially all the way around the liner. The liner itself may be formed of any suitable lining material, and in the example shown in FIG. 1, may be thin-walled cylindrical steel pipe having a corrosion resistant coating.

Access is gained to tunnel 20 from surface 29 via a vertical access shaft 30, in a conventional fashion. As previously noted, the longitudinal distances in tunnel 20 between adjacent access shafts 30 (or other openings into the tunnel) is frequently very great in modern tunnels.

Grouting machine 10 is positioned inside tunnel liner 26, and comprises generally a train of individual wheeled cars 34, 36, 38. By using three cars arranged in a train, it has been found possible to configure the equipment carried by the cars so that it will fit within a relatively small-diameter (e.g., 6-foot diameter) liner, while at the same time providing sufficient longitudinal flexibility that the train will accommodate bends and irregularities in the tunnel; however, for relatively large-diameter (e.g., 12.5-foot diameter) tunnel liners, it may be found suitable to mount the equipment on a single car rather than on several cars.

A tractor 40 is attached to one end of the train to pull the cars longitudinally through the tunnel. A second tractor 42 may be attached to the other end of the train to pull it in the other direction. In a preferred embodiment, the primary tractor 40 is attached to the end of the train which is furthest into the tunnel, away from the opening, so that the tail end of the train is readily accessible; the secondary tractor 42 can then be used to bring loads of liquid foam concentrate or other materials to the train in operation, and is only attached thereto on an "as-needed" basis to align or reverse the train. Tractors 40 and 42 may preferably be conventional diesel-powered front loaders well known to those skilled in the art. Of course, many other locomotive devices may be substituted for tractors 40, 42, including, for example, winches with cables run to the train from the access shafts.

Each of the wheeled cars 34, 36, 38, is provided with angled wheels 44 on both sides, these being configured to engage the inner wall of liner 26 at substantially perpendicular angles thereto, so as to support the cars in the proper level orientation between them, thus eliminating the need for costly and cumbersome installed rails or tracks.

The wheeled cars of mobile grouting machine 10 carry equipment for generating finished foam and mixing this with cement slurry which is pumped to the train from a remote source. Due to the nature of the operation of the cement plant (e.g., the need to supply it with truckloads of dry cement), as well as the need to generate very large quantities of slurry for use in the grouting operation, this is typically quite a large piece of equipment and it is consequently usually not feasible for this to be positioned within the tunnel itself. Accordingly, as is shown in FIG. 1, the cement mixing plant 50 is typically positioned at the surface 29, outside of the tunnel, and typically can be moved from access shaft to access shaft as needed. The mixing plant includes a dry cement hopper 52 and a water hopper 54, and the contents of these two are mixed to form the cement slurry, which may include fly ash and various additives known to those skilled in the art, in addition to portland cement and water. An output pump 56 discharges the fluid cement slurry from the mixing plant under pressure. Inasmuch as such conventional cement mixing plants are well known to those skilled in the art and do not themselves form part of the present invention, cement mixing plant 50 will not be described in greater detail.

Cement mixing plant 50 is connected to a conduit 60, which conveys the cement slurry from pump 56 to one of the cars (34) of the grouting machine 10. Because the unfoamed cement slurry is relatively fluid, it is easily pumped over the relatively great distances (e.g., several thousand feet) from access shaft 30 to grouting machine 10, without the difficulty or excessive pressures which would be encountered in pumping foamed cement grout over such distances. In order to further facilitate the pumping of the cement slurry over long distances, it has been found advantageous to form conduit 60 of low-friction, segmented, rubber-jointed steel pipe known to those skilled in the art as "slickline", with a 4-inch diameter slickline being found suitable for many applications.

The cement slurry which is pumped through conduit 60 is mixed with finished foam which is generated onboard the mobile machine 10, inside of tunnel 20, so as to form the foamed cement grout. The foamed cement grout is then pumped through a second conduit 62 (which may again be a steel "slickline") to a grout distribution manifold 64. Although (depending on the position of machine 10 in the tunnel) the distance which the foamed cement grout travels through second conduit 62 will typically be relatively short by comparison to the distance travelled by the cement slurry through conduit 60, the second conduit 62 may still be on the order of 2000 feet long. Also, second conduit 62 will preferably have a minimum length such that machine 10 is longitudinally spaced apart from the point of injection by a sufficient distance to prevent the vibration of the machine from interfering with the setting up of the grout. A minimum length of about 500 feet has been found suitable for conduit 62.

From manifold 64 the grout is distributed to a plurality of relatively short (e.g., 250 feet long) individual injection hoses 66. It has been found suitable to use three 2-inch injection hoses to distribute the grout supplied to manifold 64 by a 4-inch grout conduit 62. The end of each of the injection hoses 66 is inserted into an injection port 68 in liner 26, so that each injection hose 66 is in fluid communication with the cavity 28 between the liner and the tunnel bore. The injected foamed cement grout 70 thus flows into and fills the annular cavity 28 as it is pumped from car 34. The injection hoses are preferably flexible (e.g., rubber), so that they can be bent back on themselves from manifold 64 to a first injection port, in the position shown by broken line image 66', and can also extend down the tunnel from the manifold to a second injection port, in the position shown by solid line image 66; in this manner, an exemplary 250 feet long injection hose can be used to grout 500 feet of tunnel liner without moving manifold 64 or cars 34, 36, 38.

Because the foamed grout need only be pumped a relatively short distance through conduit 62 and hoses 66 before it is injected into the annular cavity, the viscosity and resistance to pumping exhibited by the foamed cement grout does not present the problem that it would if it were pumped through a conduit over great distances, such as that from mixing plant 50 to machine 10. Using steel "slickline" for conduit 62, it has been found feasible to pump the foamed cement grout to distances on the order of 1000–2000 linear feet, while the cement slurry is pumped to machine 10 through the first conduit 60 over distances which may range up to many thousands of feet, or even several miles.

Although only a few sets of injection ports 68 are shown in FIG. 1, it will be understood that typically such injection ports will be formed in many sets at various points along the wall of liner 26, these sets being spaced apart by longitudinal distances determined on the basis of the distance which the foamed cement grout is intended to flow longitudinally within the annular cavity 28. The wheeled cars of machine 10 permit the train to be positioned near enough each of these sets of injection ports that it is not necessary to pump the foamed cement grout over an excessively great distance (in terms of pumping difficulty) to reach them.

In a typical application, the machine 10 may start at an initial position relatively near a set of injection ports 68 which are relatively close to the opening into the tunnel, first injecting foamed cement grout into these, and then move sequentially to positions further and further along the length of the tunnel. This movement of the train is performed in stages. At the beginning of a stage, the train is connected to the surface-located cement slurry plant by the steel slickline, and then the slurry is pumped to the machine therethrough and the foamed cement grout is formed as previously described. The foamed cement grout is then pumped from the machine through the secondary slickline conduit to the manifold, and is distributed therefrom into the individual injection hoses. The distribution manifold is positioned centrally in a given segment of liner (e.g., a 500-foot-long section), and the injection hoses are led back from the manifold toward the train to a first set of injection ports which are located nearest to the train. The grout is then injected through these ports to begin the grouting of the section of the liner. A visual watch is maintained on the next set of injection ports further down the tunnel from the machine, and when the grout is seen reaching these, the appropriate grout injection line is shut off and moved down the tunnel to the injection port where the grout has appeared. The use of multiple injection hoses thus permits continuous injection of the grout to be maintained while the individual hoses are shut off as needed, moved, and then started again. Eventually, all of the injection hoses are moved to next set of injection ports, and this process is repeated until the hoses are extended down the tunnel (i.e., away from the machine 10 and manifold 64, to the furthest set of injection ports which they can reach. In this manner, the full 500-foot-long section of liner is grouted without having to move either the machine 10 or the manifold 64. Once that section has been completed, pumping of the slurry from mixing plant 50 is secured, then conduit 60 can be broken so that an additional section of pipe can be added: while the grout injection was ongoing, tractor 40 was employed to lay out pipe and cables further down the tunnel in preparation for moving the train; now, once pumping is secured, the line 60 is broken, and the tractor 40 is used to quickly advance the train by the desired distance (i.e., 500 feet in the example given above), to the next segment of the liner. The discharge line 62 of manifold 64 is moved simultaneously with the train, and then an additional section of conduit 60 is installed to reconnect the train with the surface mixing plant. The pumping of the cement slurry through the conduit 60 to the machine 10 is then restarted, and the process described above repeated to grout the next segment of liner. By this method, a uniform and effective grouting of the annular cavity 28 over the whole length of tunnel 20 can be achieved expeditiously and efficiently; the continuous injection of grout over each segment which is made possible by machine 10 enables a heretofore unavailable rate of backfilling and control over the quality of the backfill material to be attained.

Having provided an overview of the grouting machine of the present invention, a number of the components thereof will now be described in greater detail. FIG. 2 shows cars 34, 36, and 38 of grouting machine 10. Each of these cars comprises a substantially horizontal platform 70, 72, 74, on which the mixing, pumping, and other related components are mounted, and rides on wheels 44 which perpendicularly engage the wall of the tunnel liner. As described above, the wheeled cars are connected to one another in a line to form a train; in the embodiment shown in FIG. 2, the cars are attached to one another by means of tow bars 76, which may be, for example, conventional automotive tow bars.

The relatively fluid cement slurry which is supplied to grouting machine 10 through conduit 60 is discharged into a holding hopper 80 which, as will be described in greater detail below, serves to provide a constant supply of cement slurry, under a head of pressure, to the mixing and pumping apparatus of the machine. The hopper is sized sufficiently large that the supply of slurry contained therein compensates for or "smooths out" variations in the flow of cement delivered to the machine due to human error or differences in the rate of pumping from the surface mixing plant. A series of paddles 82 are at least partially submerged in the cement slurry in hopper 80, and these are attached to a longitudinally extending shaft 84 which is rotated by a hydraulic motor 86. This agitates and remixes the cement slurry in hopper 80 so as to homogenize the slurry and prevent the water and cement from separating, and also to prevent it from setting up, prior to the slurry being fed into the suction side of the pump, remembering that at this point the cement slurry has been transported for some distance and time since it was originally mixed in plant 50.

As will be described below, the cement slurry from hopper 80 is mixed with finished foam to produce the foamed cement grout which is subsequently injected into the annular cavity between the tunnel bore and liner. Conventional finished foams are formed by mixing liquid foam concentrate with air and water to form an aggregate of bubbles. Turning to FIG. 2, we see that a supply of such liquid foam concentrate is mounted on the aftermost car 38 in the form of drums 88. Car 38 is preferably provided with a rack for holding these drums, and these can be replaced as they become depleted, using tractor 42. From drums 88, the liquid foam concentrate is fed to the foam generator 90. For purposes of clarity, FIG. 2 does not show the lines interconnecting the liquid foam concentrate containers with the foam generator unit, or any other similar connecting lines, however, these will be described hereinafter with reference to FIG. 3. The water is supplied to foam generator 90 by means of a simple water hose, and this may be run through tunnel 20 from a remote source (e.g., at the surface). In another embodiment, the water may be supplied from a tank mounted on one of the wheeled cars. The final component of the finished foam is air, and this is supplied by means of an air compressor 92. The compressed air is fed from compressor 92 to a storage tank 93, and storage tank 93 is in turn connected to the foam generator unit 90. Having thus been supplied with the liquid foam concentrate, water, and air, foam generator 90 mixes these to produce the finished foam, and this is pumped from foam generator 90 to grout discharge pump 95. The liquid cement slurry is also fed into pump 95 (from hopper 80) and the finished foam and cement slurry are mixed together in the pump to form the foamed cement grout. This is subsequently pumped out through discharge line 62 to the manifold and injection lines in the manner previously described.

Grout pump 95 is operated by a hydraulic motor 97, and a number of other hydraulic motors, such as hydraulic motor 86 for the agitator assembly and the hydraulic motors (not shown) for the foam generator, operate various other portions of the systems of grouting machine 10. To provide power for these hydraulic motors, a hydraulic pump 97 is mounted on car 36 and is driven by an electric motor 98. Electric motor 98 receives its power from an electrical panel 100, and power is supplied to the electrical panel by means of electrical cables which extend through tunnel 20 from machine 10 to a remote source. In other embodiments, a diesel generator or the like may be mounted on the cars to provide the electrical power to run the hydraulic pump 97, or a diesel engine may be connected to directly drive the hydraulic pumps. Still further, the various portions of the systems may be operated by multiple electric motors, with power for these being generated by an electrical generator on the train or being supplied by a power cable which is run through the tunnel, or air motors may be employed, with compressed air being supplied by a compressor or through a supply line run through the tunnel. In the embodiment illustrated, hydraulic pump 97 preferably draws the hydraulic fluid from a reservoir 102, and a hydraulic cooler 104 is installed in the hydraulic system to keep the hydraulic fluid within the desired temperature parameters. A control station 106 is also mounted on oar 36, to provide a convenient point from which the operator can control the operations of the various systems of grouting machine 10.

FIG. 3 shows the foam generating and foam and cement slurry mixing systems of grouting machine 10 in somewhat greater detail. As was described above, the cement slurry from the surface mixing plant is discharged from supply conduit 60 into mixing hopper 80, in the direction indicated by arrow 110. From mixing hopper 80, the cement slurry flows in a generally vertical direction through throat 112 to cement intake port 118 at the suction end of a pump 95, the vertical drop between the hopper and the intake of the pump providing the pump with a constant head of supply pressure. Although the throat 112 is shown as extending more-or-less directly in a vertical direction from the hopper to the pump, it has been found advantageous in some embodiments to route throat 112 along a somewhat longer, more circuitous path so as to help prevent the formed foam from bubbling back up through the throat, as will be discussed below. Pump 95 may preferably be a positive displacement, screw-type pump rotationally operated by hydraulic motor 116; a screw-type pump which has been found to be eminently suitable for use in the present invention is a Model L-12 rotor-stator type "Moyno" pump available from Robbins & Meyers, Inc., Dayton, Ohio, and accordingly, pump 95 may be referred to from time-to-time hereinafter as a "Moyno pump". The cement slurry moves longitudinally through pump 95 from intake opening 118 generally in the direction indicated by discharge arrow 120. Downstream of intake opening 118, but still on the suction side of pump 95, the finished foam is fed into the pump from the foam generator. Being that the Moyno pump is a positive displacement pump, its output is directly related to the number of RPM's at which it is driven, and, given a supply of slurry and a supply of foam at constant rates, the Moyno pump is capable of delivering an output of foamed grout at a high rate and continuous quality.

As discussed above, the finished foam is generated from a mixture of liquid foam concentrate, air, and water. The liquid foam concentrate is drawn from container or drum 124 by a suction line 126 which is connected to the foam generator unit 90, in the direction generally indicated by arrow 128. Drum 124 may preferably be a plastic or metal drum in which liquid foam concentrate is typically supplied by the manufacturer, and these provide a convenient and easily replaced container for holding a supply of liquid foam concentrate on the mobile train, although in some embodiments a dedicated concentrate holding tank may be provided. A exemplary liquid foam concentrate suitable for use in the present invention is available from the Mearle Corporation, Roselle park, New Jersey, under the trademark "Mearle Geocel Foam Liquid". The compressed air is supplied to foam generator unit 90 from air reservoir 93 through compressed air supply line 134, the air flowing generally in the direction indicated by arrow 136. Finally, the water is supplied to foam generator unit 90 through water supply line 138, generally in the direction indicated by arrow 140. As noted above, water supply line 138 may be a steel pipe or a flexible water hose laid down through tunnel 20 (e.g., alongside cement slurry supply line 60).

Foam generator unit 90 meters and mixes the liquid foam concentrate, compressed air, and water, which are supplied thereto, so as to form finished foam. A foam generator unit which has been found eminently suitable for use in the present invention is a Model AFS-2H-20V Autofoam Unit, available from the Mearle Corporation. The Autofoam unit is equipped With hydraulic (or, in some embodiments, electric) motors which operate the pumps for drawing the liquid foam concentrate to the Autofoam unit, mixing the foam, and discharging the finished foam therefrom through finished foam supply line 142, generally in the direction indicated by arrow 144. The finished foam supply line 142 discharges through a pipe conduit 146 into the suction side of Moyno pump 92 at foam intake port 148, the proportions of the cement slurry and foam supplied to the pump being regulated according to the specifications required for a particular job. For example, the following mix design has been found suitable for grouting tunnel liners using the machine of the present invention, and has a water-solids ratio of about 0.53 and a wet density of about 40 PCF:

| Cement Slurry | | |
|---|---|---|
| cement | 341 lbs. | 1.740 CF |
| fly ash | 341 lbs. | 2.368 CF |
| water | 362 lbs. | 5.801 CF |
| Foam | | |
| foam | 35.7 lbs. | 17.090 CF |
| Total | | 27 CF or 1 cu. yard |

It has been found preferable to position foam intake port 148 downstream of cement slurry intake port 118, so as to prevent the finished foam from "bubbling up" through throat 112 into hopper 80, which may occur if foam intake port 148 is positioned at or upstream of cement slurry intake port 118; also, as was noted above, forming throat 112 with increased length and sinuosity also helps to prevent such "bubbling up". The cement slurry and finished foam are proportionally mixed within the body of Moyno pump 95 by the screw pump mechanism thereof, (with additional mixing and homogenization taking place within the first 100 feet or so of the discharge line from the pump, so as to form well-mixed foamed cement grout, and the foamed grout is discharged through the discharge end 150 of pump 95 and into grout discharge line 62, in the direction indicated generally by arrow 120.

FIG. 4 shows the hydraulic system which operates various components of the illustrated embodiment of machine 10. Shown at the left is an electric motor 98, which may be, for example, a 75-horsepower explosion-proof motor, and this drives hydraulic pump 97, which comprises a hydrostatic pump 97a and an auxiliary pump 97b. Hydrostatic pump 97a is connected by hydraulic lines 152, 154 to the hydraulic motor 96 which drives Moyno pump 92. This motor is preferably variable speed, and reversible, so as to provide flexible control over the operation of the Moyno pump.

The open loop hydraulic circuit operated by the auxiliary pump 97b is used to drive the agitator motor 86, the foam generator unit 90, and the air compressor 92. The hydraulic pressure outputted from auxiliary pump 97b is connected to a control valve assembly 160, which permits selective control of each of five or more motors separately. The control valve assembly 160 includes a 3-spool stack valve which is indicated at 162a-c, and the assembly also includes an adjustable relief valve 164. When the output from auxiliary pump 97b is connected via spool 162a to hydraulic line 166, the hydraulic fluid flows in the direction indicated by arrow 168 through fluid control valve 170 to operate hydraulic motor 86, which rotates the agitator shaft and paddles 84, 82. The discharge from motor 86 is selectively directed by control valve 172 to hydraulic line 173, through which the fluid travels in the direction indicated by arrow 174 to operate a fan motor 175 which drives the fan 178 in hydraulic cooler 104. A case drain line 176a-b from Moyno pump motor 96 is routed through the heat exchanger 177 in the hydraulic cooler, and from the heat exchanger the fluid discharges via line 179 into sump 180 in reservoir 181; in this manner, the hydraulic fluid for the entire system is maintained within the proper temperature parameters. The hydraulic fluid from fan motor 175 is similarly discharged via a hydraulic line 182 and filter 184 into sump 180.

Hydraulic fluid is drawn from sump 180 by auxiliary pump 97b, via filter 190 and suction line 192 in the direction indicated by arrow 194, and similarly, hydraulic fluid is drawn from sump 180 by the main hydrostatic pump 97a via filter 196 and suction line 198 in the direction indicated by arrow 200, passing through a first pump portion 197a' and check valves 204, 206.

Control valve assembly 160 is also used to selectively connect auxiliary pump 97b to hydraulic motor 214, through spool 162b, fluid control valve 208, and hydraulic line 210, so as to operate air compressor 92. An anti-cavitation check valve 216 is installed in a loop 218 around compressor motor 214. From motor 214, the fluid is discharged via lines 220 and 222, in the directions indicated by arrows 224 and 226, and through filter 184 into sump 180. Similarly, control valve assembly 160 connects auxiliary pump 97b to hydraulic motor 234, via spool 162c, fluid control valve 228, and hydraulic line 230, to drive the foam generator unit 90. From motor 234, the hydraulic fluid is discharged via lines 236 and 222 back to sump 180.

The exemplary hydraulic system described above has been found suitable for operating the components of mobile grouting machine 10, With quick-connect hydraulic couplings being used to connect the system components on different wheeled cars of the train. This system has been found to be particularly advantageous for use in tunnels where explosive gases might be present; however, it will be understood that any number of alternative power supply and distribution systems for operating such equipment will be obvious to those skilled in the art; for example, electrical motors may be provided for operating one or more of the components, together with an associated electrical power distribution system, or, as another example, a diesel engine may be mounted to one of the cars for operating the hydraulic pump of the above-described system, or for operating an electrical generator.

Figure 5:
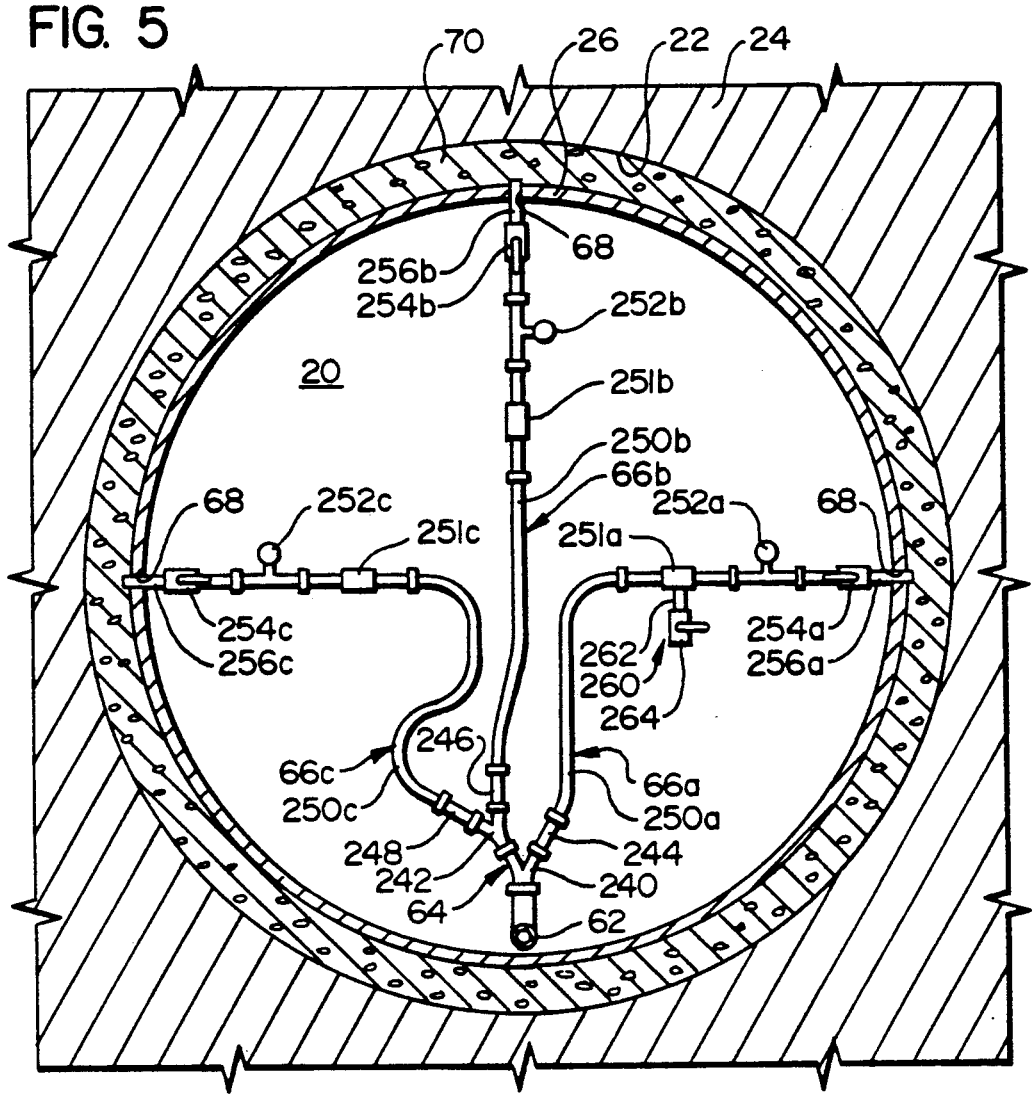
FIG. 5 is an end view of a cross-section taken through the tunnel bore and liner along line 5—5 shown in FIG. 1, showing the grout distribution manifold of the machine of FIG. 1 for distributing grout to a plurality of injection ports formed in the wall of the liner.

FIG. 5 shows the grout distribution manifold 64 for distributing the foamed cement grout from grout supply line 62 to the multiple injection ports formed in the wall of tunnel liner 26. In the embodiment shown, manifold 64 is built up from two metal (e.g., steel "Y" fittings. The first "Y" 240 is connected directly to line 62, and the second "Y" 242 is connected to one of the branches from the first "Y", so that three separate discharge streams are formed from the grout supply line. Hose attachment fittings 244, 246, 248 extend from each of these branches, and each of these, in turn, has an individual rubber injection hose 250a, 250b, 250c attached thereto. Each injection hose 250 is connected to one end of a pipe fitting 251a-c, from which a pressure gauge 252a-c extends laterally. The pressure gauges permit the system operators to visually monitor the injection pressures at each injection point to ensure that these are within the proper parameters. A ball valve 254a-c is connected on the downstream end of each pipe fitting 251 to selectively control the flow of cement grout from the injection hose 250 to an injection fitting 256a-c which is mounted at the end of each injection line 66a-c. Each injection fitting 256a-c may simply be a short length of pipe or hose, and these are sized to fit within the injection ports 68 which are formed (e.g., by boring) through the wall of tunnel liner 26. In some cases the injection ports may take the form of couplers which are cast in the liner for coupling with the injection fittings.

Accordingly, in operation, the grout supply line 62 is charged with foamed cement grout from the Moyno pump 95 on car 34, and this grout is distributed by manifold 64 to each of the grout injection lines 66. The operator personnel will insert or thread the injection fittings 256 through the injection ports 68 and into the annular cavity 28 between the tunnel bore 22 and liner 26. The operator personnel then open the ball valves to permit the pressurized foamed cement grout to flow through injection hoses 250 and into cavity 28 so as to fill it. When the cavity has been filled for a desired longitudinal length from a particular set of injection ports 68, the operator personnel secure the flow of grout through the injection lines by closing valves 254; the flexible lines permit the operator personnel to then move the injection fittings about as necessary to insert them into the next injection ports, and the process is repeated. Although the use of multiple injection hoses provides the advantages described above, it should be noted that it may be desirable in some embodiments to use a single injection hose and perhaps dispense with the grout distribution manifold.

So as to permit the quality of the foamed cement grout to be periodically checked as the injection process proceeds, a sampling fitting 260 is provided in at least one of the injection lines 66: sampling fitting 260 comprises, in the embodiment shown in FIG. 5, a second length of pipe 262 extending laterally from a pipe fitting 251, this having a ball valve 264 on the end thereof which can be selectively opened so as to permit a portion of the foamed grout to escape herefrom and be collected in a sample collection container for analysis.

Figure 6:
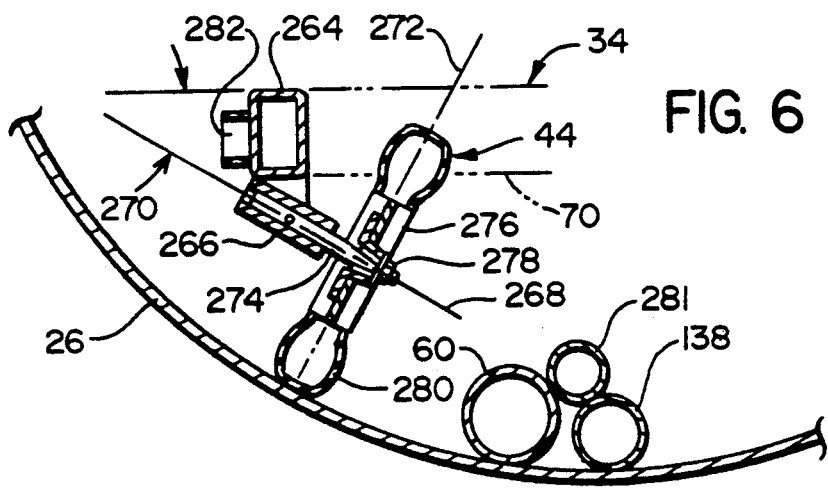
FIG. 6 is an end view of a transverse cross-section taken through a wheel of one of the cars of the grouting machine of FIG. 1, showing the angulation of the wheel so that it engages the inner wall of the tunnel liner perpendicularly thereto.

FIG. 6 shows the detail of a wheel 44 of one of the wheeled cars 34, 36, 38. As previously described, each of these cars comprises a mounting platform 70, 72, 74 which is configured to extend in a horizontal direction. In the particular view shown in FIG. 6, for example, the edge of the horizontal platform 70 of car 34 is shown. At the outboard edge of platform 70, there is a longitudinally extending frame member 264, and to the underside of this is welded a tubular axle sleeve 266. The longitudinal axis 268 of sleeve 266 extends at an angle 270 to horizontal, this angle being selected such that when the wheels 44 on either side of the car are in engagement with the cylindrical inner wall of tunnel liner 26, axis 268 intersects a radius 272 of the cylindrical sleeve at a right angle thereto. Accordingly, when the axle 274 of wheel 44 is inserted in sleeve 266, the radially extending portion of wheel 44 engages the inner wall of tunnel liner 26 at a perpendicular angle thereto, so as to achieve the most effective and stable engagement of the wall using a wheel and tire having a conventional cross-section, and so that the cars of the train trail straight when pulled through the tunnel. As noted above, a plurality of sets of axle sleeves may be mounted on each cart, these sets of sleeves extending at different angles to horizontal such that when the axle of the wheels 44 are inserted into a selected set of these sleeves, the wheels will perpendicularly engage the wall of a liner of one of several different diameters. In some embodiments, of course, it may be found preferable to employ other adjustment mechanisms for adjusting the angles of the wheels relative to the cars (e.g., by making the angle of the axle sleeve adjustable, and to make such mechanism's infinitely adjustable to accommodate a wide range of liner diameters.

Wheel 44 itself comprises a metal rim portion 276 which is rotatingly secured on the end of axle 274 by a nut 278, and a rubber tire 280 mounted about the outer portion of the rim. The rubber tires 280 on either side of the car may preferably be solid rubber tires, and engage the inner wall of tunnel liner 26 with sufficient frictional force to stabilize the car in the liner, and avoid both damage to the inner surface of the liner and the need for any sort of installed rails on which to run the train. They also support the platforms 70, 72, 74 at a sufficient height above the bottom of the liner 26 to provide clearance for the slurry supply line 60, water supply line 138, electrical power line 281, and other lines to be run along the bottom of the liner, underneath the cars, as is shown in FIG. 6.

Although tires 280 engage the walls of the tunnel liner with sufficient force to keep the platforms of the cars horizontally aligned under normal conditions, upon occasion the cars may shift out of alignment with one side or the other moving up or down the wall of the liner. To correct this situation, a conventional trailer jack having a horizontally extending engagement portion is inserted into a cylindrical socket 282 (see also FIG. 2), with the foot of the jack in engagement with the wall of the liner, and then the jack is extended to lift the edge of the car away from the wall of the tunnel liner so that the tire 280 disengages from the wall and the car can be manually shifted back into the proper horizontal alignment.

FIG. 7 shows an end view of a cross section through remixer hopper 80. As previously described, hopper 80 acts as a reservoir for feeding the cement slurry into the slurry intake port of the Moyno pump. The cement slurry, however, having traveled a significant distance from the surface mixing plant by the time it is discharged into hopper 80, may have had sufficient time to begin to separate or hydrate; if it were to remain unagitated in hopper 80 while waiting to be fed into the Moyno pump, the continued separation of the cement and water of the slurry would be detrimental to the quality of the subsequently-mixed foamed grout, and in many circumstances the slurry might well begin to set up, particularly by accumulating as a crust on the inside wall of the hopper. So as to prevent this, the cement slurry is continuously agitated and homogenizes by remixer assembly 81. As is shown in FIG. 7, remixer assembly 81 is at least partially submerged in cement slurry 290, and comprises a central shaft 84, and paddles 82. The paddles 82 are mounted to radially extending brackets 292 by means of bolts 296. Paddles 82 are preferably fabricated of a suitably tough and abrasion-resistant material, such as hard Teflon, because they are attached individually to the T-shaped brackets 292, they ar readily changed when worn out or damaged. The inner ends of brackets 292 are mounted to the square cross-section shaft 84 by first and second clamp halves 296, 298 having inner surfaces configured to engage the shaft, the inner end of bracket 292 being welded to the first bracket half and the two bracket halves being bolted together around the shaft by bolts 300. Thus, when shaft 84 is rotated by hydraulic motor 86 in the manner previously described, the paddles 82 rotate through the cement slurry in the direction indicated by arrows 301 and agitate the slurry. The outer ends 302 of the paddles fit closely within the inner wall 304 of hopper 80, thus eliminating any possibility that the slurry will accumulate on the inner wall of the hopper in the clearance between these two parts. The paddles are also positioned longitudinally along the shaft so that their ends overlap by at least a short distance (see FIG. 2), thus avoiding leaving any gaps between the coverage of the paddles in which the cement slurry could accumulate against the wall of the hopper.

As is shown in FIG. 7, the intake opening 306 of throat 112 is positioned in the wall of hopper 80 so that a pair of paddles 82e-f pass closely past the opening as the remixer is rotated. The throat 112 extends from hopper 80 in a direction which is generally in alignment with the direction of motion of the paddle and the slurry which is being pushed by the paddle (i.e., throat 112 extends more-or-less tangentially from hopper 80, as opposed to radially), so that as the paddles 82e-f pass by the intake opening 306, the slurry is pushed and directed into the throat 112 in the direction indicated by arrow 308. This helps ensure a steady flow of cement slurry to the Moyno pump, as well as complete usage of the slurry in the hopper. The act of propelling the slurry into the intake opening by the rotating paddle also helps enhance the pressure under which the slurry is supplied to the intake port of the Moyno pump.

FIG. 8 shows an overhead view of the arrangement of the rotating paddles 82 and intake opening 306 discussed in the preceding paragraph. As is shown in FIG. 8, the longitudinal axes of the pairs of paddles 82a-b and 82c-d are angled relative to the longitudinal axes of drive shaft 84 and hopper 80 so that the paddles or blades 82 form, in essence, a series of inclined planes. These react with the slurry as the paddles are rotated in hopper 80, so as to advance the cement slurry longitudinally in the hopper, as indicated generally by arrows 310, towards the intake opening 306 of throat 112. Consequently, the cement slurry is fed into the hopper at one end (see FIG. 3), and is agitated by the action of the rotating paddles 82 until it has been advanced in a screw-like fashion through the full length of hopper 80 and is discharged into intake opening 306. In this manner, a thorough agitation and remixing of the cement slurry is achieved. It should also be noted at this point that, since the drive motor for remixer assembly 81 is reversible, the rotation of the paddles 82 can be reversed to take the slurry back towards the rear of the hopper for cleanout.

While paddle pairs 82a-b and 82c-d are angled relative to the longitudinal axes of shaft 84 and hopper 80, the final pair of paddles 82e-f, which are adjacent intake opening 36, are preferably not angled with respect to the axis of shaft 84, but instead run parallel thereto. Paddles 82e-f consequently extend perpendicularly to the longitudinal axis of throat 112, so as to more effectively feed and then push or "shove" the slurry through inlet opening 36 and into the throat.

It is to be recognized that many modifications may be made to the illustrative embodiments described above without departing from the spirit and scope of the present invention. Accordingly, the invention is not to be limited except as by the appended claims.

What is claimed and desired to be secured by Letters patent of the United States is:

1. A machine for grouting an annular cavity formed intermediate an elongate external bore and a tubular internal member disposed in said bore, said machine comprising:

vehicle means configured for longitudinal movement in said tubular internal member;

means for supplying cement slurry to said vehicle means from a remote site;

foam generating means mounted on said vehicle means for forming finished foam;

mixing means mounted on said vehicle means for mixing said finished foam with said cement slurry to form foamed cement grout; and means for injecting said foamed cement grout from said vehicle means into said cavity intermediate said internal tubular member and said external bore;

whereby said vehicle means is movable longitudinally in said internal tubular member so as to permit said foamed cement to be formed and injected into said cavity at longitudinally spaced apart locations along said internal member.

2. The machine of claim 1, wherein said elongate external bore is a tunnel bore and said tubular internal member is a tunnel liner, and wherein said remote site is located at a position outside of said tunnel bore.

3. The machine of claim 2, wherein said means for supplying cement slurry to said machine from said remote site comprises:
- a cement-mixing plant located on the surface of the ground outside of said tunnel bore for mixing said cement slurry;
- a conduit connecting said cement-mixing plant to said vehicle means; and
- a pump for pumping said cement slurry from said cement-mixing plant to said vehicle means through said conduit.

4. The machine of claim 3, wherein said vehicle means comprises a train of wheeled cars extending longitudinally in said tunnel liner.

5. The machine of claim 4, wherein said train further comprises at least one tractor for moving said cars longitudinally through said tunnel liner.

6. The machine of claim 2, wherein said means for injecting said foamed cement grout comprises a conduit connecting said mixing means to said cavity intermediate said elongate tubular members.

7. The machine of claim 6, wherein said conduit comprises:
- a primary conduit having a first end connected to said mixing means;
- a manifold connected to a second end of said primary conduit;
- a plurality of flexible hoses, each said secondary hose having a first end connected to said manifold so that said foamed cement
- grout is distributed to said secondary hoses from said manifold; and
- an injection fitting mounted to a second end of each said secondary hose for injecting said grout into said cavity intermediate said tunnel liner and said tunnel bore.

8. The machine of claim 7, wherein each said injection fitting is configured to permit selective control of the flow of grout through said secondary hose to which said injection fitting is attached.

9. The machine of claim 8, wherein said injection fittings are configured to be interchangeably inserted into a plurality of spaced-apart injection ports formed in said wall of said tunnel liner.

10. The machine of claim 4, wherein said tunnel liner has a substantially cylindrical inner wall, and wherein each said car in said train has first and second wheels positioned on laterally opposite sides of said car, each said wheel extending from said car at an angle such that said wheel engages said cylindrical inner wall of said tunnel liner at a substantially perpendicular angle thereto, and said car is supported horizontally between said wheels in engagement with said cylindrical wall on said opposite sides of said car.

11. The machine of claim 10, wherein each said wheel further comprises a rubber tire for engaging said inner wall of said tunnel liner.

12. The machine of claim 1, further comprising generating means mounted to said vehicle means for generating power to operate said mixing means and said injecting means.

13. A machine for grouting an annular cavity formed intermediate a tunnel bore and a tunnel liner disposed in said tunnel bore, said machine comprising:
- a vehicle configured for longitudinal movement in said tunnel liner;
- a supply conduit for conveying cement slurry to said vehicle from a cement mixing plant positioned outside of said tunnel;
- a container mounted on said vehicle for carrying a supply of liquid foam concentrate;
- a foam generator mounted on said vehicle for mixing said liquid foam concentrate with water and air to form finished foam;
- mixing means mounted on said vehicle for mixing said cement slurry which is conveyed to said vehicle with said finished foam to form foamed cement grout;
- a discharge conduit for conveying said foamed cement grout from said vehicle to an injection point into said cavity intermediate said tunnel bore and said tunnel liner: and
- a pump mounted on said vehicle for pumping said foamed cement grout through said flexible discharge conduit and into said cavity;
- whereby said vehicle is movable longitudinally through said tunnel liner to spaced-apart locations relatively near various said injection points and said supply conduit permits said cement slurry to be conveyed to said vehicle over relatively long distances from said mixing plant at said remote location and said discharge conduit permits said grout to be conveyed from said vehicle over relatively short distances to said injection points relatively near said locations of said vehicle.

14. The machine of claim 13, wherein said vehicle comprises a train of cars configured to extend longitudinally in said tunnel liner.

15. The machine of claim 14, wherein said train further comprises a tractor attached to a forward end of said train for pulling said train into said tunnel liner from an open end thereof.

16. The machine of claim 15, wherein said container for carrying a supply of liquid foam concentrate is mounted on a said car at a rearward end of said train so as to permit said container to be periodically resupplied with containers of said liquid foam concentrate brought into said train from said open end of said tunnel liner.

17. The machine of claim 14, further comprising a generator mounted to one of said cars for generating power to operate said foam generator, said mixing means, and said pump.

18. The machine of claim 17, wherein said generator comprises a hydraulic pump, and said foam generator, mixing means, and pump are each operated by a hydraulic motor.

19. The machine of claim 13, wherein said mixing means is a portion of said pump into which said finished foam is fed from said foam generator.

20. The machine of claim 13, further comprising:
- a cement hopper mounted on said vehicle above said pump for holding a supply of said cement slurry is conveyed to said vehicle through said supply conduit from said cement mixing plant; and
- a discharge chute extending in a vertical direction from a lower portion of said cement reservoir to an intake portion of said pump below said reservoir so that said supply of cement in said reservoir is fed into said intake portion of said pump under a substantially constant head of pressure.

21. The machine of claim 20, further comprising stirring means mounted on said vehicle for stirring said supply of cement slurry which is conveyed to said cement reservoir so as to homogenize said slurry and prevent said slurry from separating before said slurry is fed into said pump.

22. The machine of claim 21, wherein said cement hopper comprises a longitudinally extending trough into which said supply conduit discharges said cement slurry.

23. The machine of claim 22, wherein said stirring means comprises:
   a plurality of paddles mounted in said trough so as to be at least partially submerged in said cement slurry in said trough; and
   means for rotating said paddles in said trough to stir said cement slurry so as to homogenize said slurry and prevent said slurry from separating.

24. The machine of claim 23, wherein said paddles are configured to drive said cement slurry longitudinally through said trough toward said discharge chute in response to rotation of said paddles in said trough.

25. The machine of claim 13, further comprising a water supply conduit connected to said vehicle for supplying water to said foam generator from a water source located outside of said tunnel liner.

26. The machine of claim 13, further comprising means mounted on said vehicle for supplying compressed air to said foam generator for mixing with said liquid foam concentrate to form said finished foam.

27. The machine of claim 26, wherein said means for supplying compressed air to said foam generator comprises:
   an air compressor mounted on said vehicle;
   a compressed air reservoir mounted on said vehicle for storing compressed air generated by said air compressor; and
   connecting means for selectively supplying said compressed air from said reservoir to said foam generator.

28. A method for grouting an annular cavity intermediate a tunnel bore and a tunnel liner disposed in said tunnel bore, said method comprising:
   positioning a vehicle for longitudinal movement in said tunnel liner;
   supplying cement slurry to said vehicle through a conduit from a cement mixing plant positioned outside of said tunnel liner;
   mixing liquid foam concentrate on said vehicle with air and water to form finished foam;
   mixing said cement slurry with said finished foam on said vehicle to form foamed cement grout; and
   pumping said foamed cement grout from said vehicle into said cavity intermediate said tunnel bore and liner.

29. The method of claim 28, further comprising the steps of:
   forming a plurality of said injection points at longitudinally spaced apart locations in said tunnel liner; and
   transporting said vehicle longitudinally in said tunnel liner to a position relatively near a selected said injection point, so that said cement slurry is pumped over a relatively long distance from said mixing plant to said vehicle and said foamed cement grout is pumped over a relatively short distance from said vehicle to said selected injection point which is relatively near said vehicle.

30. The method of claim 29, wherein the step of positioning a vehicle for longitudinal movement in said tunnel liner comprises:
   attaching a plurality of wheeled cars end-to-end so as to form a longitudinally extending train; and
   positioning said train of wheeled cars in said tunnel liner for longitudinal movement in said tunnel liner.

31. The method of claim 30, wherein said step of positioning a vehicle in said tunnel liner further comprises attaching a tractor to said train of cars for transporting said train longitudinally in said tunnel liner.

* * * * *